United States Patent
Ahmed et al.

(10) Patent No.: US 12,127,708 B2
(45) Date of Patent: Oct. 29, 2024

(54) PELLET GRILL WITH TWO PIECE FIREBOX

(71) Applicant: W.C. BRADLEY CO., Columbus, GA (US)

(72) Inventors: Mallik Ahmed, Columbus, GA (US); Bruce Roberts, Phenix City, AL (US); Anthony Hamilton, Hamilton, GA (US); Ramin Khosravi Rahmani, Columbus, GA (US); Sleiman Abdallah, Columbus, GA (US); Brad Gillespie, Midland, GA (US); Dan Corso, Columbus, GA (US)

(73) Assignee: W.C. Bradley Co., Columbus, GA (US)

(*) Notice: Subject to any disclaimer, the term of this patent is extended or adjusted under 35 U.S.C. 154(b) by 406 days.

(21) Appl. No.: 17/519,286

(22) Filed: Nov. 4, 2021

(65) Prior Publication Data
US 2022/0133087 A1     May 5, 2022

Related U.S. Application Data

(60) Provisional application No. 63/109,682, filed on Nov. 4, 2020.

(51) Int. Cl.
A47J 37/07     (2006.01)
F24B 5/02     (2006.01)

(52) U.S. Cl.
CPC ........... *A47J 37/0704* (2013.01); *F24B 5/021* (2013.01)

(58) Field of Classification Search
CPC ....... A47J 37/0704; F24B 5/021; F24B 1/207; F24B 1/22
See application file for complete search history.

(56) References Cited

U.S. PATENT DOCUMENTS

| | | | |
|---|---|---|---|
| 2,068,018 | A | 1/1937 | Goetz |
| 2,910,930 | A | 11/1959 | Hankoff |
| 3,017,954 | A | 1/1962 | Kruckewitt |
| 3,606,066 | A | 9/1971 | Anderson |
| 3,623,422 | A | 11/1971 | Marshall |
| 4,300,456 | A | 11/1981 | Messersmith |

(Continued)

FOREIGN PATENT DOCUMENTS

| | | |
|---|---|---|
| AT | 402850 B | 9/1997 |
| CH | 688303 A5 | 7/1997 |

(Continued)

OTHER PUBLICATIONS

Rider 900 Pellet Grill—Product Walkthrough, first available Feb. 19, 2020, YouTube, [online], [site visited Jan. 24, 2022], Available from internet URL: https://www.youtube.com/watch?v=3gBOTUUe22k (Year: 2020).

(Continued)

*Primary Examiner* — Alfred Basichas
(74) *Attorney, Agent, or Firm* — GableGotwals; David G. Woodral

(57) ABSTRACT

An enclosure for use in a cooking grill. The enclosure has a lower portion defining an opening that receives combustion gases from a combustion source via a bottom opening, and an upper portion interposing the lower portion and the cooking grate and having a floor with an opening that receives the lower portion and combustion gases therefrom and directs them to the cooking grate. The floor slopes to a grease drain.

16 Claims, 7 Drawing Sheets

(56) References Cited

U.S. PATENT DOCUMENTS

| | | |
|---|---|---|
| 4,593,629 A | 6/1986 | Pedersen et al. |
| 4,779,544 A | 10/1988 | Stevens |
| 4,810,510 A | 3/1989 | Lever et al. |
| 4,823,684 A | 4/1989 | Traeger et al. |
| 4,856,438 A | 8/1989 | Peugh |
| 4,909,235 A | 3/1990 | Boetcker |
| 4,966,126 A | 10/1990 | Wu |
| 5,197,379 A | 3/1993 | Leonard, Jr. |
| 5,251,607 A | 10/1993 | Traeger et al. |
| 5,375,540 A | 12/1994 | Verrecchia et al. |
| 5,423,430 A | 6/1995 | Zaffiro et al. |
| 5,429,110 A | 7/1995 | Burke et al. |
| 5,490,452 A | 2/1996 | Schlosser et al. |
| 5,809,991 A | 9/1998 | Pai |
| 5,941,234 A | 8/1999 | Norburn et al. |
| 6,039,039 A | 3/2000 | Pina, Jr. |
| 6,187,359 B1 | 2/2001 | Zuccarini |
| 6,209,533 B1 | 4/2001 | Ganard |
| 6,223,737 B1 | 5/2001 | Buckner |
| 6,293,271 B1 | 9/2001 | Barbour |
| 6,314,955 B1 | 11/2001 | Boetcker |
| 6,336,449 B1 | 1/2002 | Drisdelle et al. |
| 7,360,639 B2 | 4/2008 | Sprouse et al. |
| 7,530,351 B2 | 5/2009 | Leverty |
| 7,624,675 B2 | 12/2009 | Galdamez |
| D623,013 S | 9/2010 | Alden et al. |
| 7,900,553 B1 | 3/2011 | Maurin |
| 7,984,709 B1 | 7/2011 | Byrnes et al. |
| 8,006,686 B2 | 8/2011 | Hunt et al. |
| 8,267,078 B2 | 9/2012 | Kuntz |
| D681,394 S | 5/2013 | Parel et al. |
| 8,651,018 B1 | 2/2014 | Loud, III |
| 8,899,145 B2 | 12/2014 | Harrison et al. |
| 8,985,092 B2 | 3/2015 | Ahmed |
| D760,539 S | 7/2016 | Colston |
| 9,427,108 B2 | 8/2016 | Ahmed |
| 9,441,838 B2 | 9/2016 | Baker |
| 9,585,518 B1 | 3/2017 | Phillips |
| 9,635,978 B2 | 5/2017 | Measom et al. |
| 9,759,429 B2 | 9/2017 | Tucker |
| 9,814,354 B2 | 11/2017 | McAdams et al. |
| 9,913,559 B2 | 3/2018 | Polter et al. |
| D817,091 S | 5/2018 | Colston |
| 10,077,904 B2 | 9/2018 | Grant |
| 10,201,247 B1 | 2/2019 | Jones |
| 10,292,531 B1 | 5/2019 | Hancock et al. |
| 10,495,317 B1 | 12/2019 | Hancock et al. |
| D871,821 S | 1/2020 | Boltz et al. |
| D901,244 S | 11/2020 | Baker et al. |
| D907,424 S | 1/2021 | Measom et al. |
| D915,138 S | 4/2021 | Bennion et al. |
| D921,413 S | 6/2021 | Fitzpatrick |
| D927,917 S | 8/2021 | Yueh |
| D935,840 S | 11/2021 | Carter et al. |
| 11,166,590 B2 | 11/2021 | Zheng |
| 11,181,276 B2 | 11/2021 | Colston et al. |
| 11,181,277 B2 | 11/2021 | Donnelly et al. |
| 11,206,948 B2 | 12/2021 | Measom et al. |
| 11,231,178 B2 | 1/2022 | James |
| D945,208 S | 3/2022 | Duan et al. |
| 11,359,817 B2 | 6/2022 | Donnelly et al. |
| 2001/0017131 A1 | 8/2001 | Sim |
| 2004/0226550 A1 | 11/2004 | Hutton et al. |
| 2004/0255926 A1 | 12/2004 | Waits et al. |
| 2005/0126556 A1 | 6/2005 | Bossler |
| 2008/0085172 A1 | 4/2008 | Harman et al. |
| 2008/0098906 A1 | 5/2008 | Davis |
| 2008/0230044 A1 | 9/2008 | Warner |
| 2009/0013985 A1 | 1/2009 | Little et al. |
| 2009/0056695 A1 | 3/2009 | Cosgrove |
| 2009/0293860 A1 | 12/2009 | Carlson |
| 2010/0218754 A1 | 9/2010 | Kuntz |
| 2011/0073101 A1 | 3/2011 | Lau et al. |
| 2011/0136066 A1 | 6/2011 | Geselle et al. |
| 2011/0219957 A1 | 9/2011 | Fogolin |
| 2011/0275023 A1 | 11/2011 | Knight |
| 2013/0160757 A1 | 6/2013 | Atemboski et al. |
| 2013/0298894 A1 | 11/2013 | Kleinsasser |
| 2013/0327259 A1 | 12/2013 | Freeman |
| 2014/0261005 A1 | 9/2014 | Karau |
| 2014/0326232 A1 | 11/2014 | Traeger |
| 2014/0326233 A1 | 11/2014 | Traeger |
| 2014/0373827 A1 | 12/2014 | Zhu et al. |
| 2014/0377431 A1 | 12/2014 | Kazerouni |
| 2015/0079250 A1 | 3/2015 | Ahmed |
| 2015/0081086 A1 | 3/2015 | Hallowell et al. |
| 2015/0136109 A1 | 5/2015 | Baker |
| 2015/0182074 A1 | 7/2015 | Bucher et al. |
| 2015/0265099 A1 | 9/2015 | Coffie |
| 2015/0320259 A1 | 11/2015 | Tucker |
| 2016/0174767 A1 | 6/2016 | Schlosser et al. |
| 2016/0245529 A1 | 8/2016 | McClean |
| 2016/0255999 A1 | 9/2016 | McAdams et al. |
| 2016/0327263 A1 | 11/2016 | Traeger |
| 2016/0341423 A1 | 11/2016 | Johnson |
| 2016/0353706 A1 | 12/2016 | Gallagher et al. |
| 2017/0065124 A1 | 3/2017 | Colston |
| 2017/0067649 A1 | 3/2017 | Colston |
| 2017/0102149 A1 | 4/2017 | Nadal |
| 2017/0164783 A1 | 6/2017 | Sauerwein et al. |
| 2017/0196400 A1 | 7/2017 | Colston |
| 2017/0198917 A1 | 7/2017 | Gillespie et al. |
| 2017/0219213 A1 | 8/2017 | Measom et al. |
| 2017/0289257 A1 | 10/2017 | Colston |
| 2017/0343218 A1 | 11/2017 | Tucker |
| 2017/0370592 A1 | 12/2017 | Bogazzi |
| 2018/0028018 A1 | 2/2018 | Barnett et al. |
| 2018/0031246 A1 | 2/2018 | Barford |
| 2018/0168397 A1 | 6/2018 | Colston |
| 2018/0192822 A1 | 7/2018 | Cedar et al. |
| 2018/0213970 A1 | 8/2018 | Colston |
| 2018/0296031 A1 | 10/2018 | Terrell, Jr. et al. |
| 2018/0317707 A1 | 11/2018 | Dahle |
| 2018/0368617 A1 | 12/2018 | Allmendinger |
| 2018/0368618 A1 | 12/2018 | Measom et al. |
| 2019/0008321 A1 | 1/2019 | Allmendinger |
| 2019/0282032 A1 | 9/2019 | Colston et al. |
| 2019/0290064 A1 | 9/2019 | Colston et al. |
| 2019/0290066 A1 | 9/2019 | Colston |
| 2019/0293295 A1 | 9/2019 | Colston et al. |
| 2019/0335774 A1 | 11/2019 | Garces et al. |
| 2019/0365152 A1 | 12/2019 | Dahle et al. |
| 2019/0374065 A1 | 12/2019 | Hancock et al. |
| 2019/0387924 A1 | 12/2019 | Zheng |
| 2020/0086780 A1 | 3/2020 | Baker et al. |
| 2020/0113382 A1 | 4/2020 | Ahmed et al. |
| 2020/0116349 A1 | 4/2020 | Rahmani et al. |
| 2020/0158337 A1 | 5/2020 | Baker et al. |
| 2020/0214304 A1 | 7/2020 | Garces et al. |
| 2020/0214501 A1 | 7/2020 | Gafford et al. |
| 2020/0221717 A1 | 7/2020 | Jackson |
| 2020/0237148 A1 | 7/2020 | Donnelly |
| 2020/0333011 A1 | 10/2020 | Ahmed et al. |
| 2020/0370752 A1 | 11/2020 | Ahmed et al. |
| 2021/0267413 A1 | 9/2021 | Roberts et al. |
| 2021/0298333 A1 | 9/2021 | Strong et al. |
| 2021/0341144 A1 | 11/2021 | Parsons et al. |
| 2021/0356130 A1 | 11/2021 | Li |
| 2021/0361115 A1 | 11/2021 | Colston et al. |
| 2022/0046937 A1 | 2/2022 | Simon et al. |
| 2022/0082262 A1 | 3/2022 | Colston et al. |

FOREIGN PATENT DOCUMENTS

| | | |
|---|---|---|
| CN | 201515960 U | 6/2010 |
| CN | 102345861 A | 2/2012 |
| CN | 203549790 U | 4/2014 |
| CN | 105263378 | 1/2016 |
| CN | 103989414 B | 5/2016 |
| DE | 102009014010 A1 | 10/2010 |
| DE | 4020171009570011 S | 6/2018 |
| FR | 713315 A | 10/1931 |
| KR | 100752761 B1 | 8/2007 |
| KR | 100821465 B1 | 4/2008 |

(56) References Cited

FOREIGN PATENT DOCUMENTS

| KR | 20090119121 A | 11/2009 |
|---|---|---|
| WO | 2013116946 A1 | 8/2013 |
| WO | 2017044598 A1 | 3/2017 |
| WO | 2017064528 A1 | 4/2017 |
| WO | WO2018111155 | 6/2018 |
| WO | 2018125681 A1 | 7/2018 |
| WO | 2018208919 A1 | 11/2018 |
| WO | PCT/US2020/020487 | 5/2020 |
| WO | PCT/US2020/035535 | 10/2020 |
| WO | PCT/US2021/020303 | 5/2021 |
| WO | PCT/US2021/58103 | 3/2022 |

OTHER PUBLICATIONS

Char-Broil_ W.C. Bradley Co, W.C. Bradley, [online], [site visited Jan. 24, 2022], Available from internet URL: https://www.wcbradley.com/divisions/char-broil (Year: 2022).

Rider 900 Pellet Grill, Oklahoma Joes, [online], [site visited Jan. 24, 2022], Available from internet URL: https://www.oklahomajoes.com/rider-900-pellet-grill (Year: 2022).

Kornrumpf et al, "Electric Stoves, Calrods and Cooking with Electricity", Mar. 16, 2015, p. 2, Publisher: Edicson Tech Center; 2015.

Feb. 28, 2020, China Search Report issued by National Intellectual Property Administration, P.R. China for 202080032060.5; W.C. Bradley Co.

PELLET GRILL WITH TWO PIECE FIREBOX

CROSS-REFERENCE TO RELATED CASES

This application claims the benefit of U.S. provisional patent application Ser. No. 63/109,682, filed on Nov. 4, 2020, and incorporates such provisional application by reference into this disclosure as if fully set out at this point.

FIELD OF THE INVENTION

This disclosure relates to solid fuel cooking in general and, more particularly, to systems for cooking using solid fuel pellets.

BACKGROUND OF THE INVENTION

Outdoor wood pellet fired cooking and smoking appliances are described, for example, in U.S. Pat. Nos. 4,823,684 and 5,251,607, both to Joseph Traeger, et al. Over the years there have been many improvements and variations of these products made but their essential principal of operation remains the same. An electrically driven auger transports small compressed wood pellets from an exterior hopper to a typically open top cylindrical combustion chamber, or firepot, inside an enclosed cooking chamber with an openable lid. This combustion chamber is supplied with combustion air pressurized and driven by an exterior fan through ductwork to an area surrounding the firepot and then through holes in the exterior of the firepot feeding air into the combustion space. The hot gas from the firepot is conveyed through a series of baffles to a cooking grate placed above the firepot and baffles where it heats the food placed on the cooking grate.

Such appliances may be used to cook meat, often in large pieces, such as roasts or briskets. Cooking may take place for long periods of time (on the order of hours), at low to moderate temperatures of 200° F. to 400° F. Sizes of appliances and cooking surfaces may vary as there is a desire to accommodate large quantities of meat. To provide even cooking across the cooking grate area, the set of baffles above the firepot must be optimized to produce a relatively low thermal intensity in terms of energy output per unit of area. Some products have been built with variable configuration baffles designed to provide greater heat at specific partial areas of the cooking surface defined by the cooking grates. See, for example, US Patent Application No 2018/0368618 to Measom et. al or US Patent Application No 2013/0298894 to Kleinsasser.

For appliances having a relatively large cooking area (common in the marketplace) it may become very difficult to obtain higher temperatures across the entire cooking surface (e.g., on the order of 700° F. or greater) required to assure searing in all weather conditions simply by upsizing, or by more rapidly running the auger feed from the pellet hopper. Such difficulty is, first of all, based on the problem of evenly distributing heat from a concentrated heat source (e.g., a single firepot), to a large, typically rectangular, cooking area without absorbing or losing too much heat in the baffle structure necessary to accomplish this. A second difficulty, from a commercial point of view, is the expense of scaling up the auger drive and combustion air fan delivery and firepot structure. Thus, it has remained the case that most such pellet appliances described do not perform well for grilling, particularly in providing high cooking grate temperatures as mentioned above. Many such products cannot exceed 600° F. at the cooking grate. The relatively low temperatures attained also are correlated with slow warm up times, considerably slower than those attained with a gas grill. The grills designed with variable baffles can only provide high temperatures in a limited part of the cook surface by their very nature.

What is needed is a system and method for addressing the above, and related, issues.

SUMMARY OF THE INVENTION

The invention of the present disclosure, in one aspect thereof, comprises an enclosure for use in a cooking grill having a combustion source and a cooking grate above the combustion source, the enclosure comprising a lower portion defining an opening that receives combustion gases from the combustion source via a bottom opening, and an upper portion interposing the lower portion and the cooking grate and having a floor with an opening that receives the lower portion and combustion gases therefrom and directs them to the cooking grate. The floor slopes to a grease drain.

In some embodiments, the enclosure further comprises a baffle suspended within the upper portion over the opening in the floor. The lower portion may extend into the upper portion to prevent grease on the floor from flowing into the opening in the floor. The enclosure may comprise a flange on the lower portion protruding away from the opening in the floor. The flange may be elevated from the floor by a standoff. In some cases, the floor curves upward near the opening in the floor to prevent grease on the floor from flowing into the opening in the floor.

The lower portion may increase in cross sectional area from a bottom portion to top portion thereof. The upper portion may have vertical wall below the cooking grate that joins to the floor. The upper portion may increase in cross sectional area from the floor toward the cooking grate.

The invention of the present disclosure, in another aspect thereof, comprises a cooking grill having a combustion source, a cooking grate above the combustion source, and a two part enclosure interposing the combustion source and the cooking grate, the enclosure having an increased cross sectional area proximate the cooking grate compared to a cross sectional area proximate the combustion source. The enclosure directs grease from the cooking grate into a grease drain and away from a lower part of the enclosure.

In some embodiments, the second part of the enclosure joins the first part of the enclosure via an opening in a floor of the first part of the enclosure. A baffle may be suspended by the first part of the enclosure over the opening in the floor, the baffle being sloped to direct grease onto the floor but away from the opening in the floor. The floor may be sloped toward the grease drain.

In some cases, the second part of the enclosure extends beyond the opening in the floor into the first part of the enclosure. A plurality of flanges may be provided on the second part of the enclosure extending away from the opening in the floor of the first part of the enclosure.

The invention of the present disclosure, in another aspect thereof, comprises a method including providing an upper portion of an enclosure below a cooking grate, providing a lower portion of an enclosure directing combustion gases from a combustion source into the upper portion of the enclosure, providing a floor in the upper portion of the enclosure having an opening into which the lower portion is fitted, and providing a baffle affixed to the upper portion of the enclosure covering the opening in the floor to prevent grease from the cooking grate from entering into the lower portion of the enclosure.

In some cases, the method includes sloping the floor to a grease drain at a low point of the floor. It may include extending the lower portion of the enclosure into the opening in the floor of the upper portion a sufficient amount to prevent grease flowing into the opening. A flange may be provided on the lower portion, the flange extending into the upper portion above the floor. The method can include configuring the enclosure to have an increasing cross section but limited volume from the combustion source to the cooking grate.

DETAILED DESCRIPTION OF THE PREFERRED EMBODIMENTS

Figure 1:
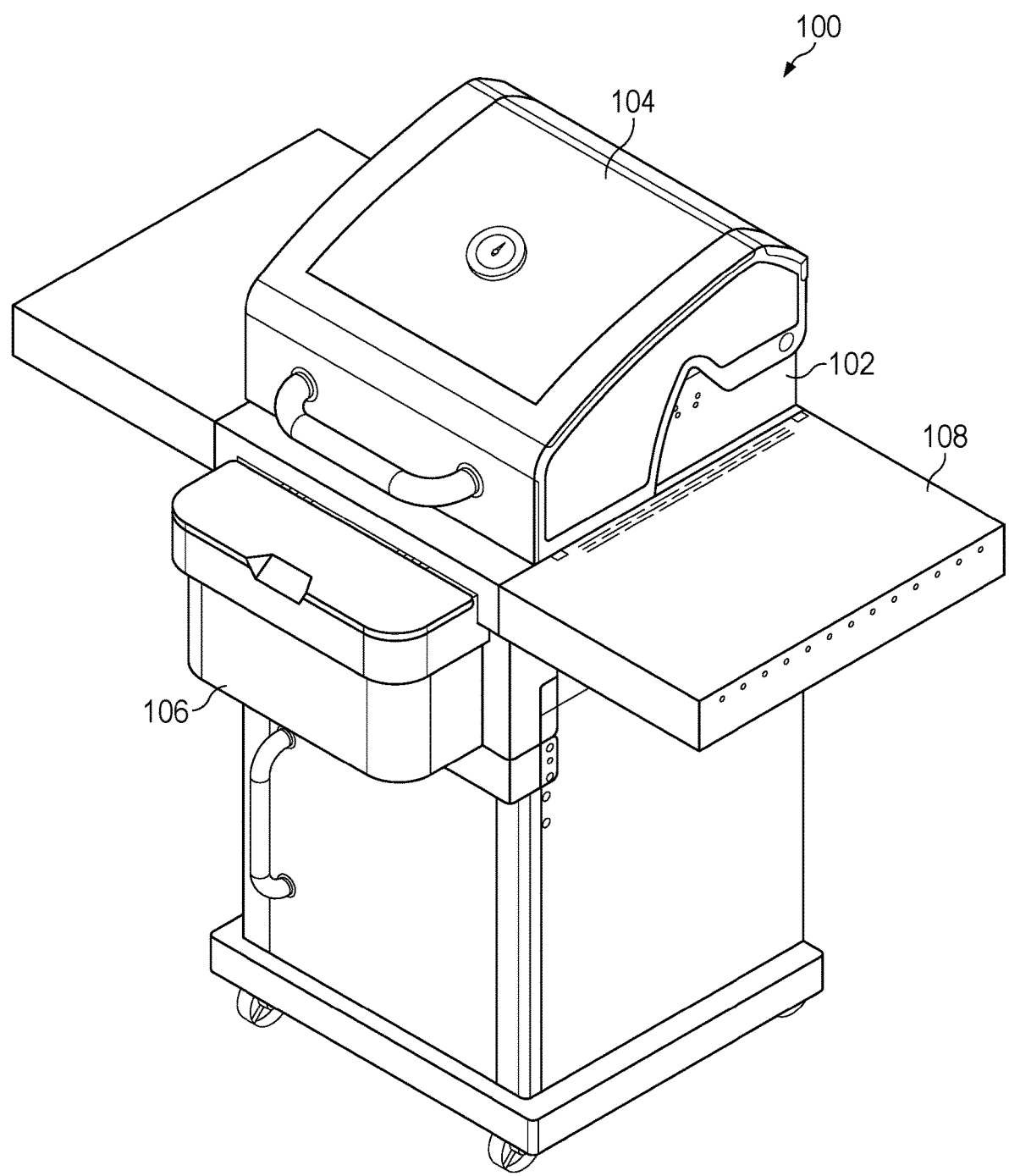
FIG. 1 is a perspective view of a cooking grill according to aspects of the present disclosure.

Referring now to FIG. 1, a perspective view of a cooking grill according to aspects of the present disclosure is shown. From the exterior, the grill 100 can be seen to comprise a firebox 102 with an openable lid 104. The lid 104 may be hinged from the back and have a handle for opening and closing. A front pellet feeding hopper system 106 can be seen where the user feeds fuel pellets for auguring into the firebox for combustion. The pellet feeding hopper system 106 or another such system may also be mounted to the back, left side or right side of the grill 100. Side shelves 108 and other helpful implements may be provided in various embodiments.

Figure 2:
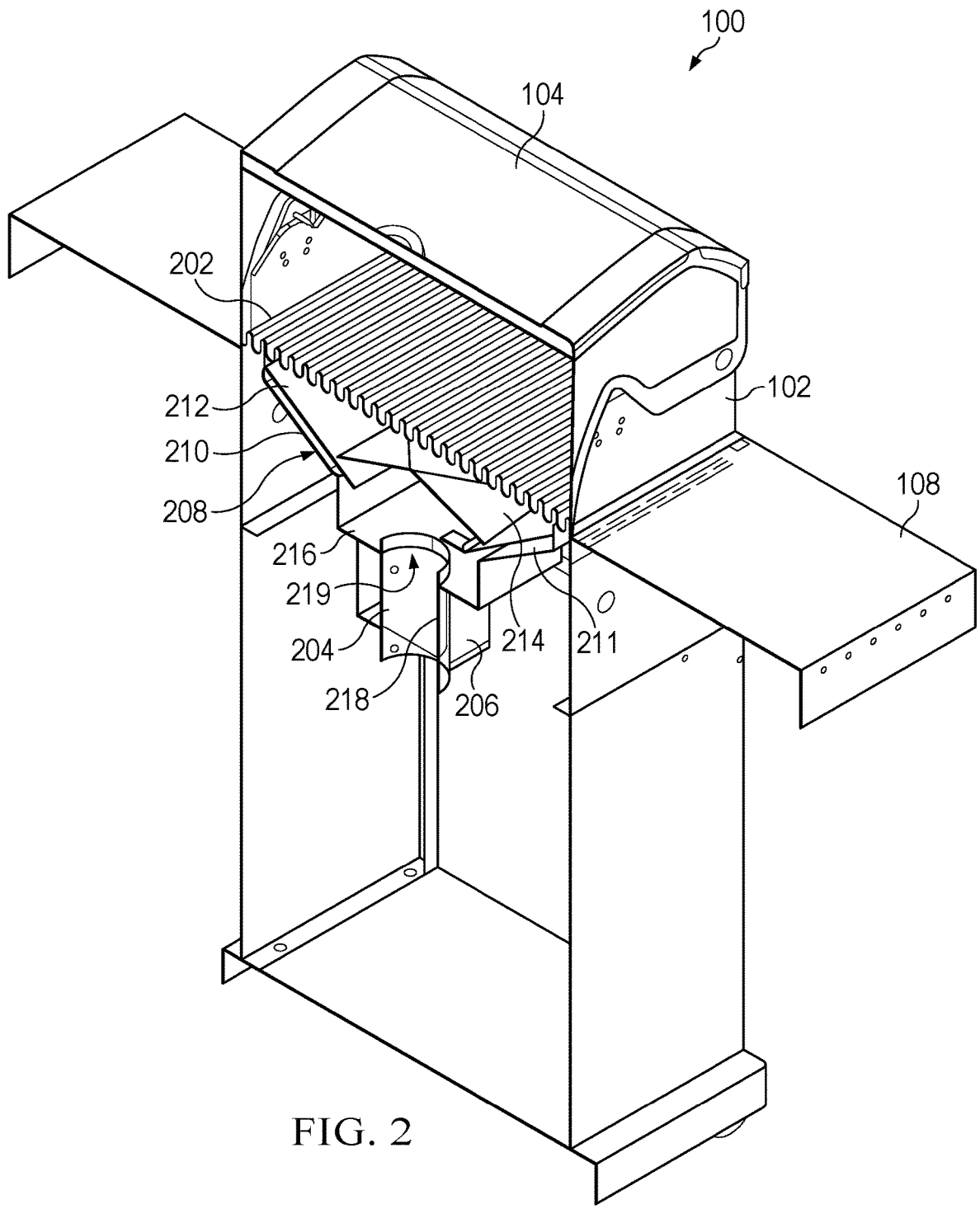
FIG. 2 is a front perspective cutaway view of the cooking grill of FIG. 1.
Figure 3:
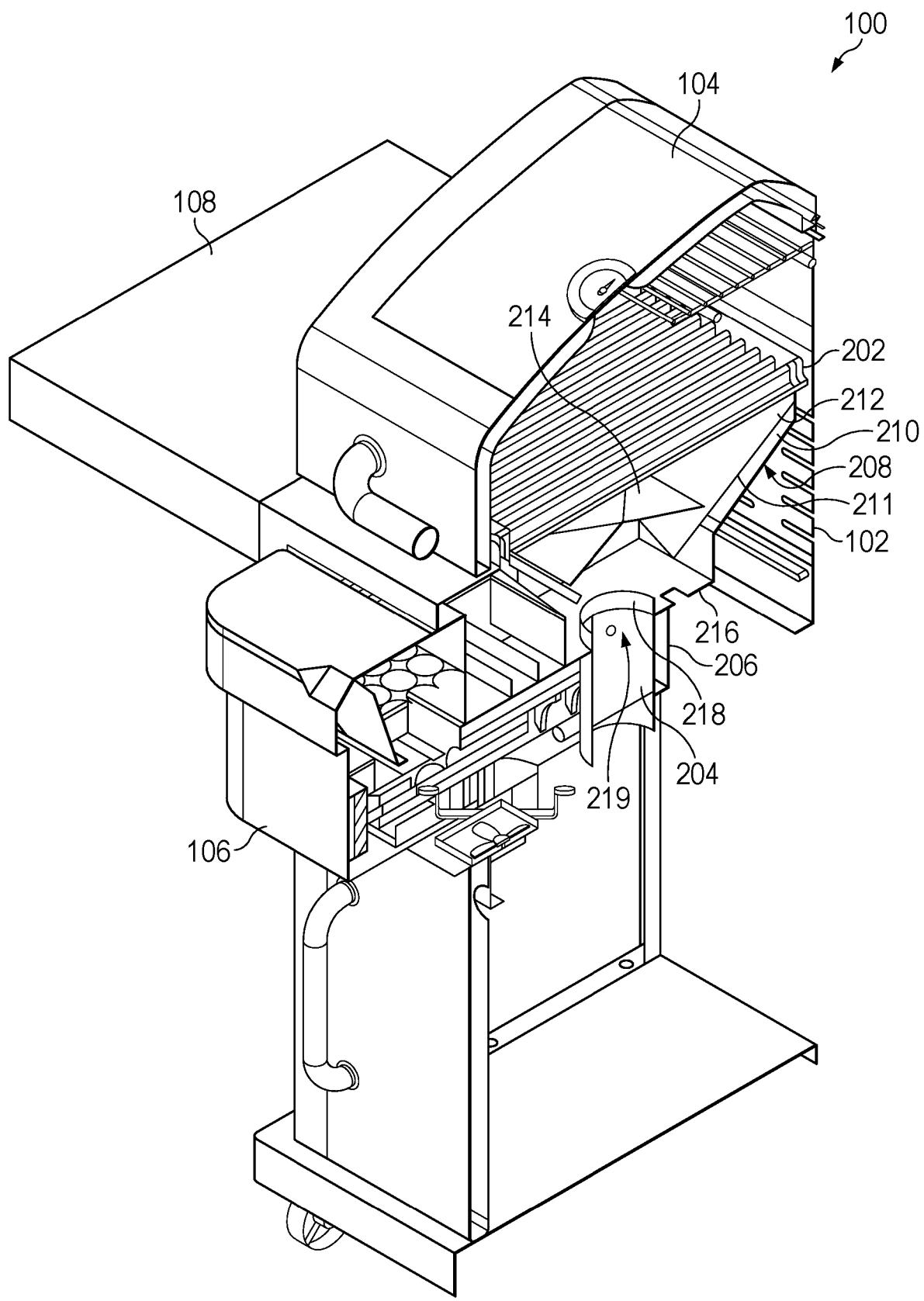
FIG. 3 is a side perspective cutaway view of the cooking grill of FIG. 1.

FIG. 2 is a front perspective cutaway view of the cooking grill of FIG. 1. FIG. 3 provides a complementary side perspective cutaway view. Here the interior of the firebox 102 can be seen, including a cooking grate 202 placed above a heat or combustion source. In the present embodiment, the heat source includes a firepot 204. The firepot 204 may have perforations or air openings for receiving combustion air from an air duct 206. In some embodiments, air in the duct 206 is pressurized to drive air into the firepot 204 to control or enhance the combustion of wood pellets or other fuel in the firepot 204. Fuel may be driven into the firepot 204 by an auger or other motive device and may be controlled by a user, thereby providing additional control over the heat and combustion within the firebox 102. Heated combustion gases may flow from the firepot 204 via exhaust or combustion opening 219. In some embodiments the opening 219 is round corresponding with an overall cylindrical shape of the firepot 204.

A double walled enclosure 208 provides for transport of heated gases and combustion products from the firepot 204 to the cooking grate 202. It will be appreciated that an area defined by the opening 219 may be much smaller in area that the cooking grate 202. As the firepot 204 may be a relatively small and/or concentrated heat and combustion source relative to the surface area of the cooking grate 202, the double walled enclosure 208 provides for transport of the combustion products and heat from the firepot 204 to the cooking grate 202 in such a manner as to heat most or all of the cooking grate 202 to a high temperature suitable for grilling.

The double walled enclosure may be thought of as a manifold for transport of the heated gas and combustion products to the cooking grate 202. With the decrease in thermal loss into the firebox 102 and out of the same from the concentrated heat source of the firepot 204, the firepot 204 provides sufficient heat not only for low temperature slow cooking, but also and for higher temperature grilling and searing operations at the cooking grate 202.

The double walled enclosure 208 may provide an outer wall 210 with an inner wall 212 nested therein but spaced apart therefrom. An insulating air space 211 may thereby be defined between the inner wall 210 and outer wall 212. In some embodiments, the space 211 is not empty or air-filled but filled with an insulating material. The insulating material may comprise ceramic mineral wool type insulation, a high temperature aerogel, or some other form of additional heat barrier interposed between the inner wall 210 and the outer wall 212. In some embodiments, only a portion of the space 211 may be insulated (for example, nearest to the cooking grate 202 or nearest to the firepot 204).

In some embodiments, the enclosure 208 is double walled across all of the vertical distance between the firepot 204 and the cooking grate 202. In other embodiments, the enclosure spans the entire vertical space, but is double walled across only a portion of the vertical distance (e.g., nearest the cooking grate 202, for example). It may also be double walled only on a lower portion, or only on a medial portion. In some embodiments, the inner wall 212 may be equidistantly spaced from the outer wall 210. In other embodiments the walls 210, 212 may be spaced closer together near the cooking grate 202 or lower near the firepot 204.

In some embodiments, a drip pan 216 sits below the double walled enclosure 208 and joins to the firepot 204. The drip pan 216 may collect any grease or other drippings from the cooking grate 202 that may run down the inner wall 212 toward the firepot 204. In some embodiments, a lip 218 surrounds the top opening of the firepot 204 to prevent collected grease from running into the firepot 204 and affecting heat or burn characteristics. The drip pan 216 may be removable, or provide drainage holes into a catch cup or the like for emptying grease and other accumulations.

As discussed above, certain ash and coal particles may escape from the firepot 204 during combustion. These may tend to travel upwardly with the convection currents of the heated gases. A baffle 214 may be provided within the enclosure 208 to help arrest such particles. The baffle 214 may be a single or multi-piece component. In some embodiments, it is located within and affixed to the inner wall 212 of the enclosure 208. The enclosure 208 may be generally square or rectangular in horizontal cross section to conform to the square or rectangular shape that may be seen in the cooking grate 202, and to guide gases from the firepot 204 accordingly. The baffle 214 may be configured to extend horizontally from the relatively flat sides of the inner wall 212, and/or from the "corners" of the inner wall 212 as a horizontal rectilinear cross section is defined by the inner wall 212.

Figure 4:
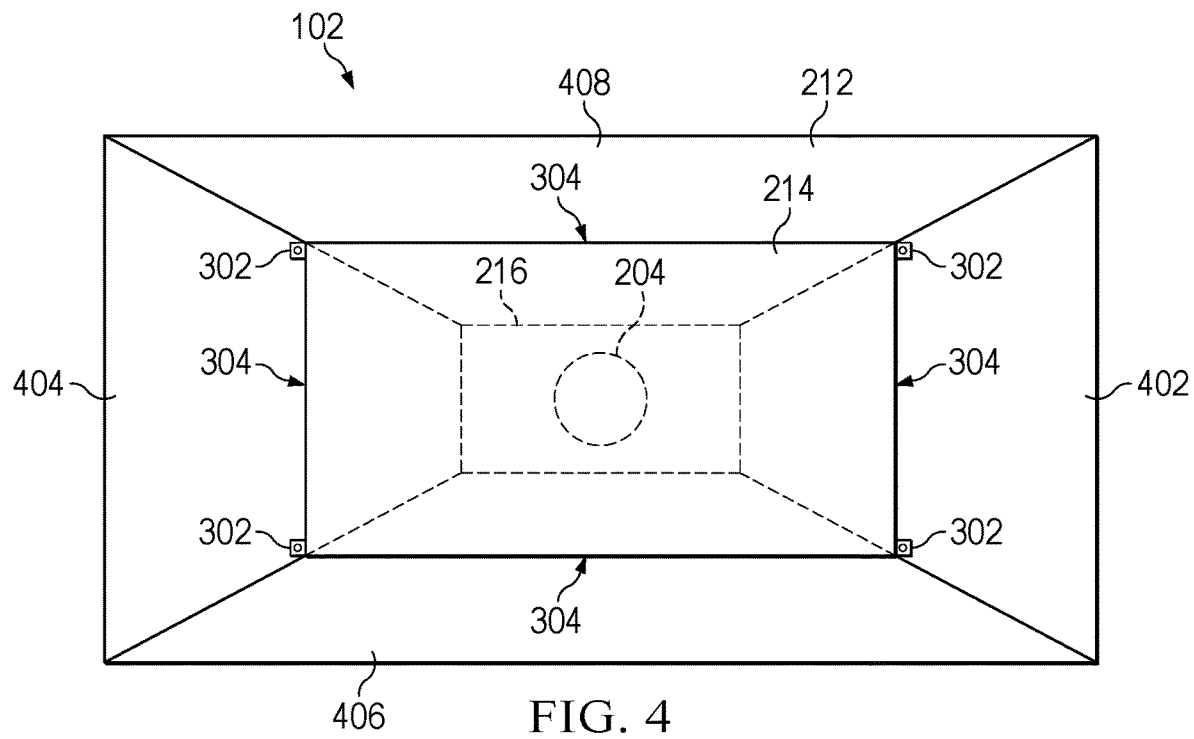
FIG. 4 is a top down view into the firebox of the cooking grill of FIG. 1 with a baffle ghosted to show components below.

FIG. 4 is a top down view into the firebox of the cooking grill of FIG. 1 with the baffle 214 ghosted to show components placement. Viewed from above, the baffle 214 has a rectilinear outline. The baffle 214 may be centered over the firepot 204, which may be centered in the drip tray 216. However, these components are not necessarily centered in all embodiments. In some embodiments, the inner wall 212 may comprise four downward sloped planar panels 402, 404, 406, 408, which may correspond to right, left, front, and back sides, respectively (if viewed, for example, from the front of the cooking grill 100). It should be understood that the outer wall 210 may be comprised of corresponding panels.

It should also be understood that the illustrated embodiments of the present disclosure describe an enclosure 208 having a rectilinear cross section. This configuration accommodates a rectangular cooking grate 202 and is at least partially responsible for the ability of systems of the present disclosure to evenly heat a large cooking grate having a shape different from that of the firepot 204 (e.g., round). However, in embodiments where a round cooking grate is provided, the enclosure 208 and baffle 214 may have a corresponding round horizontal cross section. In other embodiments, it may be that only a portion of the cooking grate 202 would be heated by the firepot 204 such that the horizontal cross section of the enclosure 208 may not directly correspond directly to the shape or dimensions of the cooking grate 202.

Standoffs 302 may be provided that affix the baffle 214 to one or more of the panels 402, 404, 406, 408 of the inner wall 212. Thus gaps 304 may be provided interposing the baffle 214 and one or more of the panels 402, 404, 406, 408. The gaps 304 allow for flow of combustion gases but the baffle 214 itself impedes flow of cinders and other solid particles. The gaps 304 also allow for liquids and other materials that might fall through the cooking grate 202 to be directed to the drip tray 216 but away from the firepot 204. The gaps 304 may not be uniform between the baffle 214 and one or more of the panels 402, 404, 406, 408. Further, spacing between the baffle 214 and one or more of the panels 402, 404, 406, 408 may vary within a particular gap 304. In some embodiments, gaps 304 are only present between one, two, or three of the 402, 404, 406, 408 and the baffle 214 (in other words the baffle 214 may attach to one or more of the panels 402, 404, 406, 408 such that there is no gap at such panel).

Figure 5:
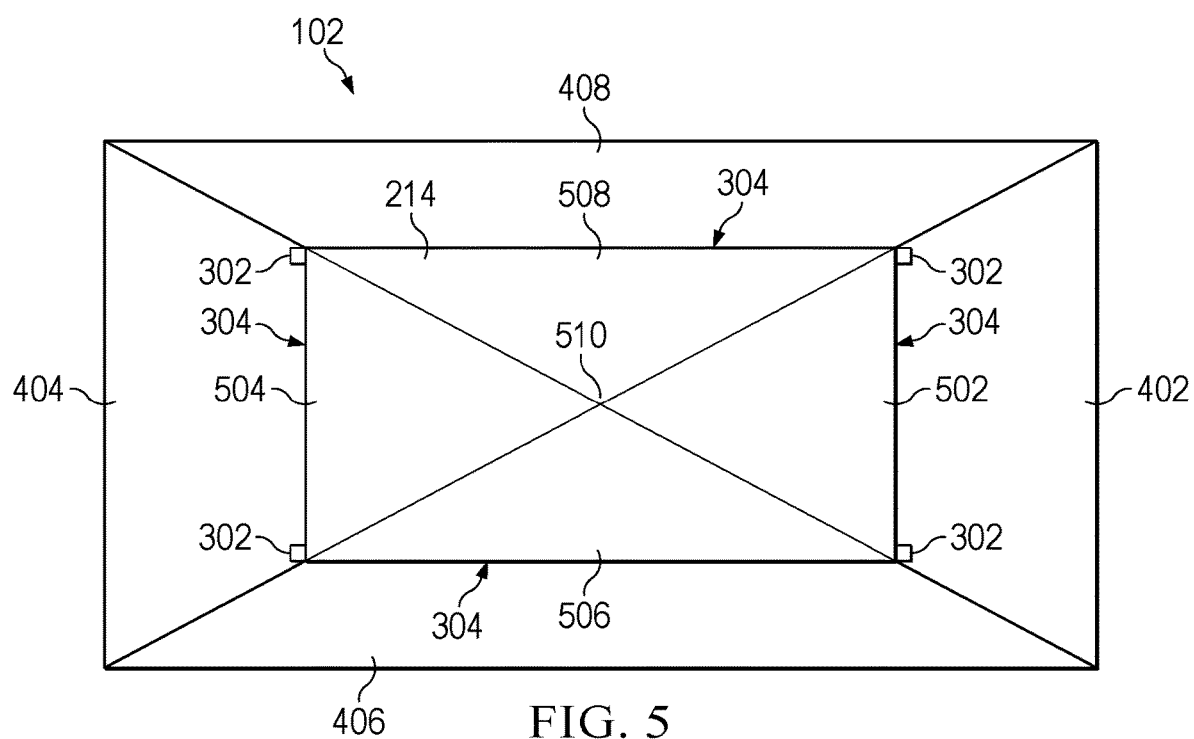
FIG. 5 is a top down view into the firebox of the cooking grill of FIG. 1.

FIG. 5 is a top down view into the firebox 102 of the cooking grill 100 of FIG. 1. As can be seen from this viewpoint in conjunction with the perspective views of FIGS. 2-3, the baffle 214 may have a pyramidal shape with four walls 502, 504, 506, 508 rising upward toward the cooking grate 202 from near the respective panels 402, 404, 406, 408 of the inner wall 212 of the enclosure 208. In some embodiments, each panel 402, 404, 406, 408 is spaced apart from each wall 502, 504, 506, 508 with a standoff 302, spacing fastener, or the like such that there is a gap 304 between each respective panel/wall pair. This may promote even heating of the cooking grate 202. However, in other embodiments, gaps 304 may not be provided between each panel/wall pair. Additionally, the baffle 214 may not attach to each of the four panels 402, 404, 406, 408 although in some embodiments this promotes stability of the baffle 214.

The four walls 502, 504, 506, 508 may meet at an apex 510 corresponding to the upper most point of the baffle 214.

The baffle 214, in addition to trapping cinders, ash, and other solid particles and preventing them from reaching the cooking grate 202, may also serve as a thermal re-emitter. As the baffle 214 is heated from combustion gases, it may radiate a significant amount of heat toward the cooking grate 202. Furthermore, the baffle 214 may serve as a vaporizer plate that converts fat or other drippings to smoke to enhance flavor of food being cooked on the cooking grate 202. Finally, the sloped walls 502, 504, 506, 508 guide anything falling onto the baffle 214 that is not vaporized onto the respective panels 402, 404, 406, 408 of the inner wall 212 where they may fall onto the drip tray 216.

It should be appreciated that the baffle 214 may be the only baffle between the firepot 204 and the cooking grate 202. In some embodiments, the baffle 214 is imperforate and does not admit any combustion products therethrough (in other words, all gas air or fluid flow from the firepot to the cooking grate 202 is via the one or more gaps 304). In other embodiments, the baffle 214 could have openings or apertures (not shown) to redistribute convective heat from the combustion gases produced in the firepot 204. Such openings may take the form of piercings, holes of various shapes, grids, screens, hooded openings, louvres, or other openings. In other embodiments, openings through the baffle 214 may take the form of a pipe, tunnel, or tortured path such that some convection gases may flow through but solid materials such as cinders and ash are not likely to flow through.

Configurations of various embodiments of FIGS. 1-6 can be seen to include an enclosure 102 having an increasing cross-sectional area (from bottom to top) while having a limited interior volume (compared to the firebox 102). However, the inner wall 212 of enclosure 102 is of one piece (e.g., a single slope or one step). In some embodiments, as described below, further arrangements are made for grease handling, particularly when cooking at lower temperatures where the meat drippings will not be vaporized by the pyramidal baffle 214.

Figure 6:
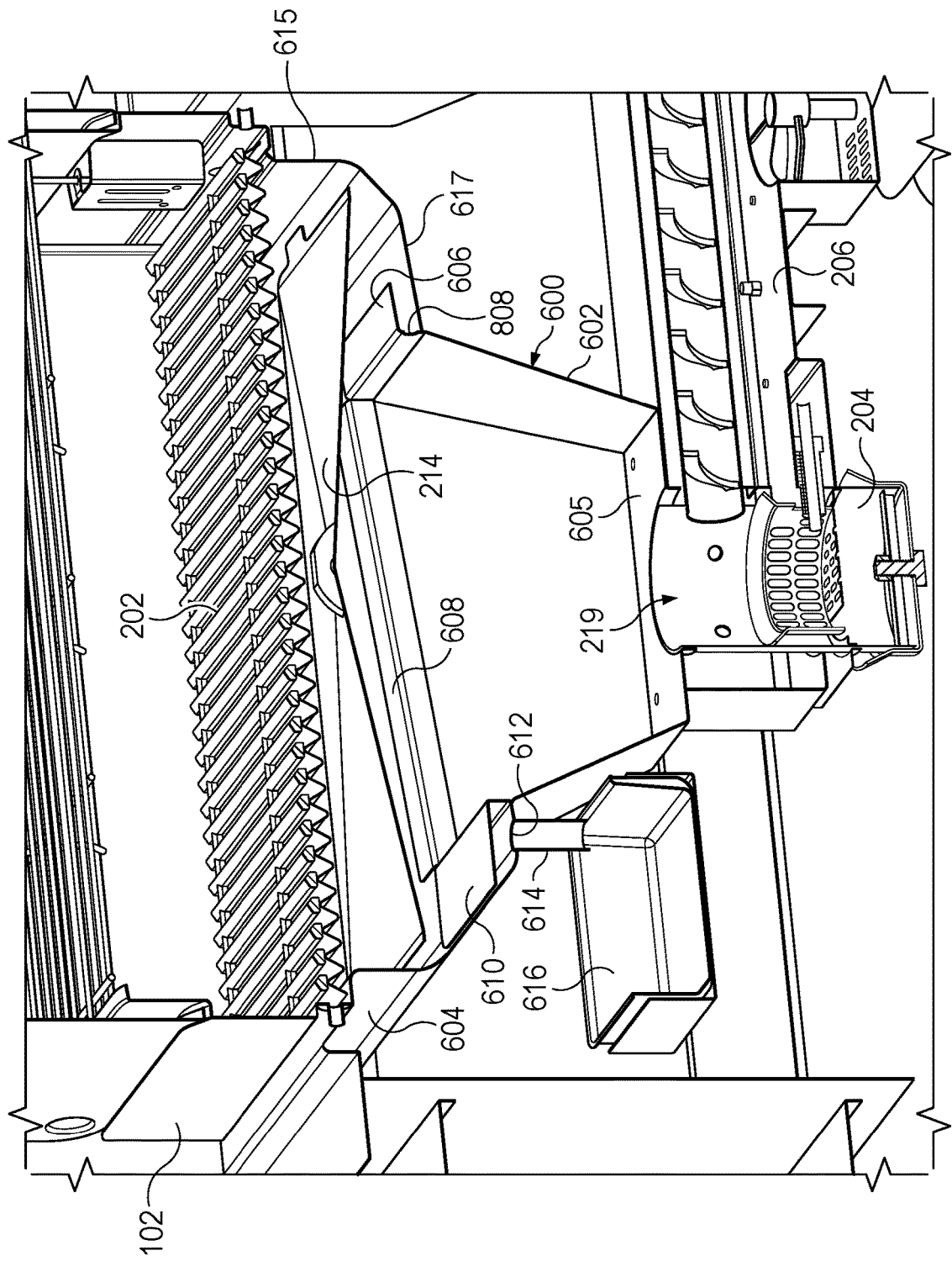
FIG. 6 is a closeup perspective cutaway view of another cooking grill according to aspects of the present disclosure.

Referring now to FIG. 6, a closeup perspective cutaway view of another cooking grill according to aspects of the present disclosure is shown. In the illustrated embodiment, the enclosure 208 is replaced by enclosure 600. The enclosure 600 still contains the baffle 214 as described above, with substantially similar or identical function. However, the enclosure 600 comprises a distinct lower portion 602 and upper portion 604. The lower portion 602 and upper portion 604 are components that may exposed within and/or below the firebox 102 to guide and contain grease from the cooking grate 202 and/or the baffle 214. In this way they take the place of the inner wall 212 of the enclosure 600. It should be understood that one or both of the lower portion 602 and upper portion 604 could, themselves, have a double walled construction. However, by separating the enclosure 600 into two pieces, the lower portion 602 can act in a more specific way as an expansion limiting duct, and therefore it has been found it is not strictly necessary to use double walls to achieve targeted high temperatures for grilling. Further, the upper portion 604 is optimized to handle grease when cooking at lower temperatures where the meat drippings will not be vaporized by the pyramidal baffle 214.

The lower portion 602 receives heat and combustion products from the firepot 204 via opening 219 in a floor 605 of the lower portion 602. The floor 605 may be planar or flat, or could have other configurations. The floor 605 may also be level or substantially so as grease handling is primarily done in the upper portion 604. In some embodiments, the lower portion 602 has four sides of a planar, trapezoidal shape such that a rectilinear horizontal cross section is defined along all or part of its height. Walls of the lower portion 602 may be sloped so as to define an area of increasing cross sectional area along all or a portion of its height. At the same time, the internal volume of the lower portion 602 is limited to such a degree that heat and combustion gases from the firepot 204 are delivered upwardly to toward the baffle 214 and cooking grate 202 at sufficient temperature to create the desired higher cooking temperatures when wanted.

The lower portion 602 is shown as having a slab-sided appearance or configuration but it could also have a frusto-conical shape. A parabolic shape or a hemispherical shape may be utilized in some configurations depending upon the temperatures desired. While such embodiments may not provide the same temperature performance, they would still reflect the improved grease handling characteristics as described herein.

The upper portion 604 retains the baffle 214 and may have an outline at or near a top thereof that substantially mirrors the shape of the cooking grate 202 and/or a plan view of the baffle 214. As with previous embodiments, the baffle 214 may be spaced apart from the walls of the upper portion 604. The upper portion 604 may be dished, slab sided, or have a more complicated geometric shape so as to guide combustion products and gases from the lower portion 602 around the baffle 214 and upward to the cooking grate 202. In some embodiments, the upper portion 604 may have an outer wall 615 that may descend from at or near the cooking grate 602 allowing for fitment of the baffle 214 before joining to a floor 617 defining an opening 808 that receives the lower portion 602 of the enclosure 600. The outer wall 615 may be vertical over some portion and/or a portion of it may have a sloped or conic cross section. The floor 617 may be sloped for grease handling characteristics. The floor 617 may be planar but could have other shapes to promote grease flow.

In lower temperature cooking, grease and other drippings from the cooking grate 202 may not vaporize on either the baffle 214 or the upper portion 604. Instead, they may run downward from the baffle 214 to collect on the floor 617 or wall 615 of the upper portion 604. It may be desirable to prevent excessive collection of these dripping on the upper portion 604, and therefore a drain 612 may be provided in the floor 617 that directs drippings and fluids into a catch pan or tray 616. In some embodiments a drain tube 614 ensures fluids from the drain 612 are guided fully into the catch pan 616. To ensure that fluids and drippings are guided toward the drain 612, the floor 617 of the upper portion 604 may be sloped in the direction of the drain 612. In some embodiment, the upper portion 604 comprises a lower floor that receives the lower portion 602, and is also sloped toward the drain 612.

Figure 7:
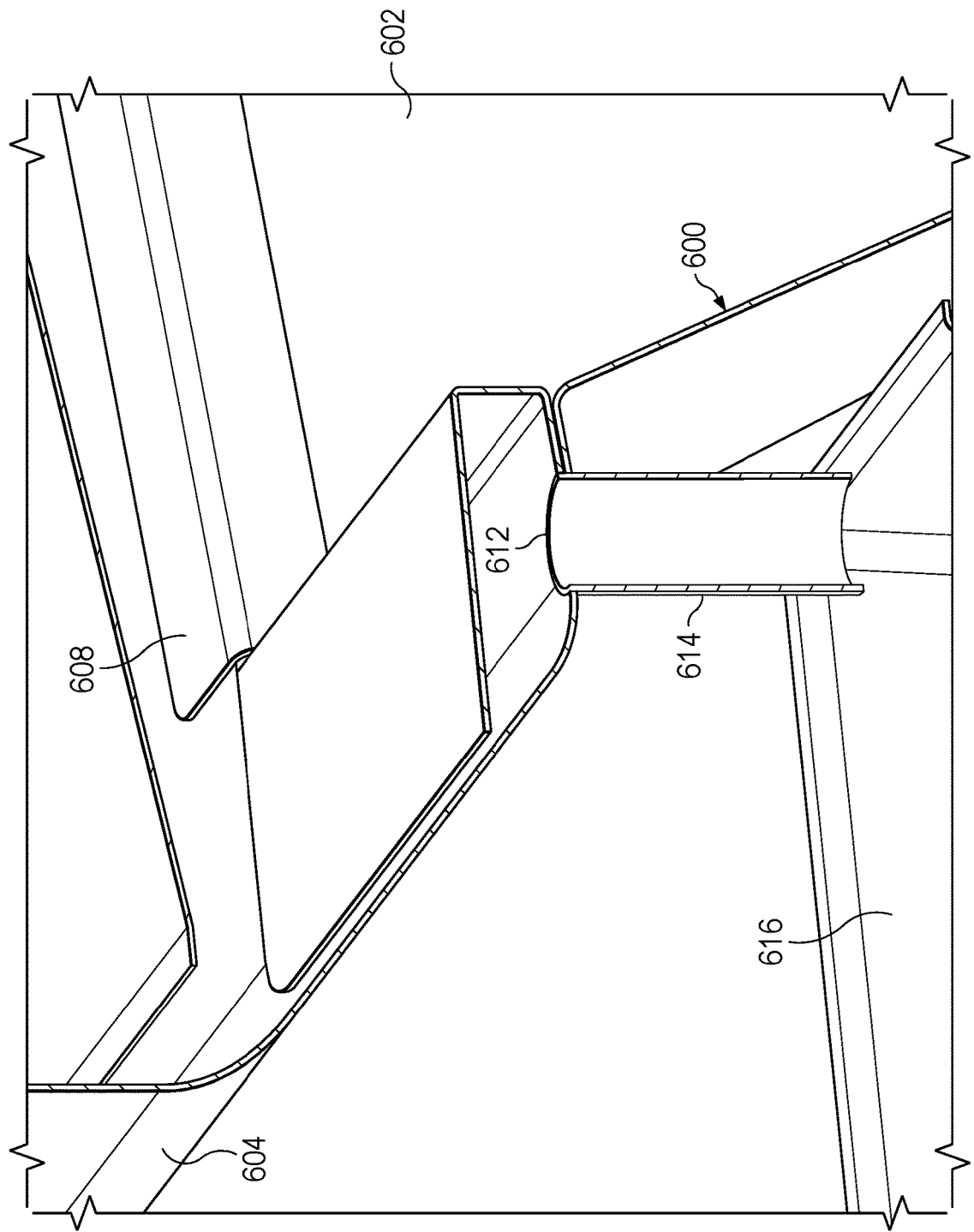
FIG. 7 is a closeup perspective cutaway view of a portion of a firebox of the grill of FIG. 6.
Figure 8:
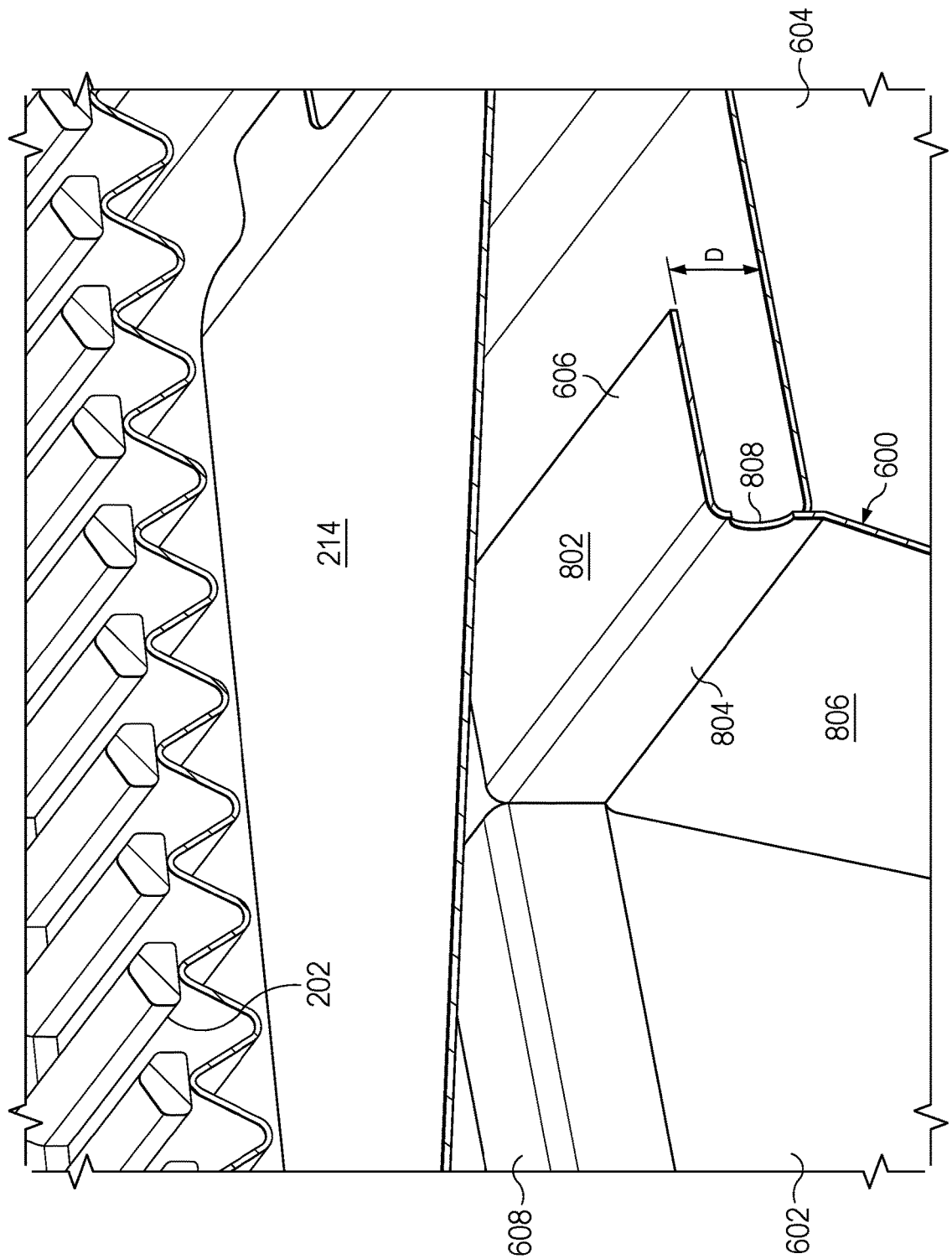
FIG. 8 is a closeup perspective cutaway view of another portion of the firebox of the grill of FIG. 6.

Referring now also to FIG. 7, a closeup perspective cutaway view of an end portion of the firebox 102 of the grill of FIG. 6 is shown. FIG. 8 is a closeup perspective cutaway view of the opposite side portion of the firebox 102 of the grill of FIG. 6. From these views it can be seen that the lower portion 600 comprises a plurality of flanges 606, 608, 610 that extend into the upper portion 604 (with one or more fourth flanges out of frame). They may be spaced apart a distance 'D' from the floor 617 of the upper portion 604. This spacing may result from the location on the walls of the lower portion 602 that attach within the opening 808 defined in the floor 617 of the upper portion 604 (e.g., the lower portion 602 may attach medially within the upper portion 604), or the walls of the lower portion 602 may provide standoffs interposing the walls and the flanges 606, 608, 610 and/or others.

As shown in FIG. 8, for example, a wall 806 of the lower portion 602 may affix to part of an opening 808 defined by the upper portion 604. A standoff 804 (or an upper portion of the wall 806) may extend the distance 'D' into the upper portion 604, whereupon a flange 802 may extend laterally away from the wall 806. It should be understood that the lower portion 602 may have four flanges (one per wall), or a single continuous flange, or a plurality of smaller flanges, that substantially cover an area of the upper portion 604 near the opening 808 for admitting the lower portion 602.

The upper portion of the walls of the lower portion 602 (or standoffs 904), by extending into the upper portion 604 above a floor thereof, prevent grease from running into the firepot 204, or even into the lower, hotter area of the lower portion 602 (such as lower walls or floor) where they may combust. In some embodiments, an inner portion of the floor 617 bends or extends upward around the opening 808 to prevent leakage of grease below the standoffs 606, 608,610.

As described above, the baffle 214 may serve to stop, catch, or otherwise limit cinders and other solid combustion products from reaching the cooking grate 202. However, absent the flanges (e.g., 606, 608, 610 or others) solid combustion products can come into contact with trapped grease or fats and ignite it before it has moved into the catch pan 616. The flanges therefore extend away from the lower portion 602 where it enters the upper portion 604 forming a protected area. The area nearest the lower portion 602 may be the hottest part of the upper portion 604 and also most likely to catch a live cinder or ember. However, with the flanged arrangement, such ember will land on the flange (which should be substantially free of grease) or further away from the inner portion where it may have cooled before reaching any grease. A flange (such as flange 610) may also cover the drain 612 to minimize the chance of any embers entering the catch pan 616.

From the foregoing, it can be appreciated that the lower portion 602, forming a duct of progressively increasing cross sectional area but deliberately limited volume, reduces the drop in temperature of hot gas caused by expansion of the gas. A limited outer surface area of the lower portion 604 reduces heat loss due to conduction, radiation, and convection. The limited area around the periphery of the heat baffle 214 fitting inside the upper portion 604 creates a high pressure drop leading to substantial heat transfer to the baffle 214 and thus creates a relatively even but intense radiative heating at the cooking grate 212.

The combination of radiative and convective heating provides high temperatures across the entire cooking surface. The cooking grate 202 can be of the traditional open bar type of grate or it can be constructed in accordance with U.S. Pat. No. 9,955,817 or 10,034,577 thus providing further increased radiative heating of the food on the cooking surface.

The upper portion 604 then deals with the issue of grease management, particularly when cooking at lower temperatures when the drippings from the meat will not be vaporized in by the baffle 214, but will flow off it and be routed under gravity a low point in the floor 617 equipped with a drain 612 leading to grease collection tray 616. The interface between the upper portion 604 and lower portion 602 is designed such that no liquid grease will be able to drain into the duct (lower portion 602) and approach the open top 219 of the firepot 204. It is further the case that substantial overlap of the lower portion 602 parallel to and above the opening in the upper portion 604 (e.g., by the flanges 606, 608, 610 and possibly others), into which the lower portion 602 fits, acts to shield the evacuated grease from heat which may be radiated down from the baffle 214, thus reducing the likelihood of ignition of the grease before drainage into the grease collection tray 616.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. An enclosure for use in a cooking grill having a combustion source and a cooking grate above the combustion source, the enclosure comprising:
    a lower portion defining an opening that receives combustion gases from the combustion source via a bottom opening;
    an upper portion interposing the lower portion and the cooking grate and having an outer, wall joining to a floor defining a first opening that receives the lower portion and defining a second opening adjacent to the first opening, the upper portion receiving combustion gases from the lower portion and directing them to the cooking grate; and
    a grease drain fitted to the second opening;
    wherein the floor slopes downwardly toward the grease drain.

2. The enclosure of claim 1, further comprising a baffle suspended within the upper portion over the first opening in the floor.

3. The enclosure of claim 2, wherein the lower portion extends into the upper portion to prevent grease on the floor from flowing into the first opening in the floor.

4. The enclosure of claim 3, further comprising a flange on the lower portion protruding away from the opening in the floor.

5. The enclosure of claim 4, wherein the flange is elevated from the floor by a standoff.

6. The enclosure of claim 2, wherein the floor curves upward near the opening in the floor to prevent grease on the floor from flowing into the opening in the floor.

7. The enclosure of claim 2, wherein the lower portion increases in cross sectional area from a bottom portion to top portion thereof.

8. The enclosure of claim 7, wherein the outer wall has a vertical portion below the cooking grate that joins to the floor.

9. The enclosure of claim 7, wherein the upper portion increases in cross section area from the floor toward the cooking grate.

10. A cooking grill comprising:
    a combustion source;
    a cooking grate above the combustion source; and a two part enclosure interposing the combustion source and the cooking grate, the enclosure having an increased cross sectional area proximate the cooking grate compared to a cross sectional area proximate the combustion source;

wherein a first, upper part of the two part enclosure provides a sloped floor between the combustion source and cooking grate, the sloped floor defining a first opening receiving a second, lower part of the two part enclosure;

wherein the second, lower part of the two part enclosure terminates at a flange inside the first, upper part of the two part enclosure that is spaced apart from the sloped floor; and wherein the sloped floor defines a second, grease opening at a lower level than the first opening.

11. The cooking grill of claim 10, further comprising a baffle suspended by the first, upper part of the two part enclosure over the first opening in the floor, the baffle being sloped to direct grease onto the floor but away from the first opening in the floor.

12. A method comprising:
providing an upper portion of an enclosure below a cooking grate;
providing a lower portion of an enclosure directing combustion gases from a combustion source into the upper portion of the enclosure;
providing a floor in the upper portion of the enclosure having an opening into which the lower portion is fitted; and
providing an imperforate baffle affixed to the upper portion of the enclosure covering the opening in the floor to prevent grease from the cooking grate from entering into the lower portion of the enclosure.

13. The method of claim 12, further comprising sloping the floor to a grease drain at a low point of the floor.

14. The method of claim 13, further comprising extending the lower portion of the enclosure into the opening in the floor of the upper portion a sufficient amount to prevent grease flowing into the opening.

15. The method of claim 14, further comprising providing a flange on the lower portion, the flange extending into the upper portion above the floor.

16. The method of claim 12, further comprising configuring the enclosure to have an increasing cross section but limited volume from the combustion source to the cooking grate.

* * * * *